United States Patent [19]

Ishiwata et al.

[11] Patent Number: 4,813,450
[45] Date of Patent: Mar. 21, 1989

[54] FLUID PRESSURE CONTROL VALVE

[75] Inventors: Ichiro Ishiwata; Keiji Nakagawa, both of Yokosuka, Japan

[73] Assignee: Nippon Air Brake Co., Ltd., Kobe, Japan

[21] Appl. No.: 28,688

[22] Filed: Mar. 20, 1987

[30] Foreign Application Priority Data

May 6, 1986 [JP] Japan .............................. 61-066966
Jan. 19, 1987 [JP] Japan .............................. 62-004854

[51] Int. Cl.[4] .............................................. B60T 8/26
[52] U.S. Cl. .......................... 137/505.25; 251/337;
267/170; 303/9.73
[58] Field of Search ................... 137/505.25; 251/337;
303/6 C, 9.73; 267/170

[56] References Cited

U.S. PATENT DOCUMENTS

| 2,401,856 | 6/1946 | Brock | 251/337 X |
|---|---|---|---|
| 4,475,339 | 10/1984 | Inoue | 137/505.25 |
| 4,543,988 | 10/1985 | Huveteau | 267/170 X |

FOREIGN PATENT DOCUMENTS

| 2304500 | 2/1976 | France | 303/6 C |
|---|---|---|---|
| 53-5373 | 1/1978 | Japan | 303/6 C |
| 59-63064 | 4/1984 | Japan | 137/505.25 |
| 481729 | 10/1975 | U.S.S.R. | 267/170 |
| 2051984 | 1/1981 | United Kingdom | 303/6 C |

Primary Examiner—Robert G. Nilson
Attorney, Agent, or Firm—Wenderoth, Lind & Ponack

[57] ABSTRACT

A fluid pressure control valve includes a housing having an inner hole and a plunger movably disposed in the inner hole, the housing having inlet and non-pressure chambers defined herein at one end of the plunger and an outlet chamber defined therein at the opposite end of the plunger, the housing also having a passage communicating the outlet chamber with the inlet chamber. A valve device is disposed in the passage and openable and closable in response to movement of the plunger. A preloading spring is disposed in the housing for normally urging the plunger in a direction to open the valve device. The housing comprises a cylindrical member having one open end and a cover member closing the open end. A spring seat is disposed in the cylindrical member in engagement with the cover member, the preloading spring acting between the spring seat and the plunger. The spring seat is force-fitted in the inner hole of the housing or in the cover member.

6 Claims, 1 Drawing Sheet

FLUID PRESSURE CONTROL VALVE

BACKGROUND OF THE INVENTION

1. Field of the Invention

The present invention relates to a fluid pressure control valve for use in a braking system of an automobile or the like.

2. Prior Art:

One fluid pressure control valve is disclosed in Japanese Laid-Open Utility Model Publication No. 59(1984-63064.

The disclosed fluid pressure control valve has a valve body defining inlet and outlet chambers communicating with each other through a passage, a valve device disposed in the passage and capable of shutting off the communication between the inlet and outlet chambers, and a plunger for selectively opening and closing the valve device. The plunger is moved in a direction to close the valve device against the bias of a preloading spring when the pressure in the inlet and outlet chambers reaches a prescribed pressure level.

One end of the preloading spring engages the plunger through a spring seat whereas the other end engages a cover member of the body through another spring seat. The other spring seat held against the cover member is of an outside diameter smaller than the inside diameter of the inlet chamber, and is fitted over the plunger and only pressed against the cover member under the spring force. Therefore, the other spring seat tends to be tilted and compressed when assembled. When this happens, the plunger is caused to be inclinded owing to a localized load imposed by the preloading spring, resulting in sluggish movement or scratching of the plunger as it slides. The fluid pressure control valve may then fail to operate properly.

SUMMARY OF THE INVENTION

In view of the aforesaid problems of the above conventional fluid pressure control valve, it is an object of the present invention to provide a fluid pressure control valve in which a spring seat bearing on one end of a preloading spring can be mounted in place easily and reliably in a proper orientation.

According to the present invention, a fluid pressure control valve includes a housing having an inner hole and a plunger movably disposed in the inner hole, the housing having inlet and non-pressure chambers defined therein at one end of the plunger and an outlet chamber defined therein at the opposite end of the plunger, the housing also having a passage fluidly communicating the outlet chamber with the inlet chamber. A valve device is disposed in the passage and openable and closable in response to movement of the plunger. A preloading spring is disposed in the housing for normally urging the plunger in a direction to open the valve device. The housing comprises a cylindrical member having one open end and a cover member closing the open end. A spring seat is disposed in the cylindrical member in engagement with the cover member, the preloading spring acting between the spring seat and the plunger. The spring seat is force-fitted in the inner hole of the housing or in a recess defined in the cover member.

Because the spring seat which engages one end of the preloading spring is held against the peripheral surface of the inner hole of the housing or held in position by the cover member, the spring seat has limited radial movement, and is prevented from being tilted when assembled in position. Therefore, the spring seat can always be mounted properly in position, and no malfunction will take place that would otherwise result from improper positioning of the spring seat in the housing.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
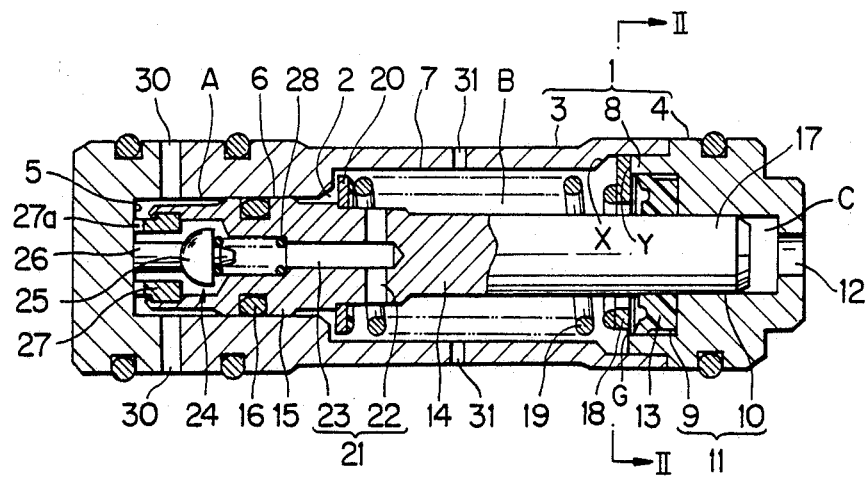
FIG. 1 is a longitudinal cross-sectional view of a fluid pressure control valve according to an embodiment of the present invention.

As shown in FIG. 1, a fluid pressure control valve according to an embodiment of the present invention has a valve body or housing 1 comprising a cylindrical member 3 having an inner hole 2 with one end open and a cover member 4 closing the open end of the cylindrical member 3. The inner hole 2 is a stepped hole including a smaller-diameter hole 6 near the closed end 5 thereof, an intermediate larger-diameter hole 7, and an open hole 8 having a diameter slightly larger than the intermediate hole 7, the holes 6, 7, 8 being axially arranged in series. The cover member 4 is fitted in the open hole 8. The cover member 4 has a stepped recess 11 composed of a recess 9 opening into the inner hole 2 and a hole 10 opening in the bottom of the recess 9. The cover member 4 also has an air vent passage 12 defined through the bottom of the hole 10. A sealing member 13 is fitted in the recess 9 in the cover member 4.

Figure 2:
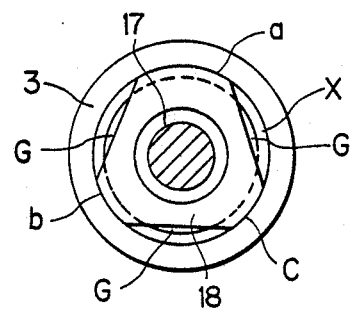
FIG. 2 is a cross-sectional view taken along line II—II of FIG. 1.

A plunger 14 is slidably housed in the inner hole 2. The plunger 14 has a stepped shape including a larger-diameter portion 15 near one end thereof, the larger-diameter portion 15 slidably fitted in the smaller-diameter hole 6 with a sealing member 16 therebetween. the opposite end 17 of the plunger 14 is slidably inserted in the hole 10 of the cover member 4 through the sealing member 13. The plunger 14 is normally urged to move toward the smaller-diameter hole 6 by a preloading spring 19 disposed around the plunger 14, the spring 19 having one end supported by the cover member 4 through a spring seat 18 and an opposite end supported by the plunger 14 through a spring seat 20. The plunger 14 defines an outlet chamber A in the smaller-diameter hole 6, an inlet chamber B in the larger-diameter hole 7, and a non-pressure chamber C in the hole 10. The spring seat 18 has such a size that its outer peripheral edge is held in sliding contact with the inner peripheral surface of the open hole 8. The spring seat 18 is fitted into the open hole 8 to a step X between the open hole 8 and the larger-diameter hole 7, and engages an end surface of the cover member 4. As shown in FIG. 2, the spring seat 18 has a polygonal shape including three angularly spaced arcuate surfaces a, b, c held against the inner peripheral surface of the open hole 8.

The plunger 14 has a passage 21 defined therein and providing communication between the inlet and outlet chambers B, A. The passage 21 comprises a dimetrical through passageway 22 opening into the inlet chamber B and an axial passageway 23 opening into the outlet chamber A. A valve device 24 has a valve member 25 operatively disposed in the passageway 23 for selectively shutting off communication between the inlet and outlet chambers B, A. the valve member 25 is normally urged by a valve spring 28 to be seated on a seat member 27 having a hole 27a and attached to the plunger 14 at the end of the passageway 23, for thereby pressing stem 26 against the closed end 5 of the inner hole 2.

The valve housing 1 has an outlet 30 communicating with the outlet chamber A and an inlet 31 communicating with inlet chamber B. The outlet 30 is able to be connected to a wheel brake cylinder of an automobile (not shown) through a suitable pipe, and the inlet 31 is connected by a pipe to the pressure chamber of a master cylinder for generating a braking fluid pressure.

The fluid pressure control valve may be fixedly inserted in an appropriate hole defined in a desired device, such as a hole defined in a brake master cylinder parallel to the cylinder bore thereof.

Operation of the fluid pressure control valve constructed as shown in FIGS. 1 and 2 will be described below.

When the brake is not actuated and no fluid pressure is produced in the pressure chamber of the brake master cylinder, the components of the fluid pressure control valve are in the illustrated position, and the valve device 24 is open with the valve member 25 unseated off the seat member 27.

If the driver operates the brake master cylinder by depressing the brake pedal, a fluid pressure is generated by the brake master cylinder. While the generated fluid pressure is low, it is transmitted through the inlet 31 into the inlet chamber B, and then passes through the passageways 22, 23 the hole 27a, and the outlet chamber A, from which the fluid pressure is transmitted, without being subjected to a pressure reduction, through the outlet 30 and the pipe to the brake cylinder. Thereafter, when the generated fluid pressure is increased to the extent where the pressure acting on the differential area between the effective pressure-bearing area of the plunger 14 with respect to the inlet chamber B and the effective pressure-bearing area of the plunger 14 with respect to the outlet chamber A reaches a prescribed level, then the plunger 14 is moved to the right (FIG. 1) until the seat member 27 is seated on the valve member 25, whereupon the valve device 24 is closed. The pressure in the outlet chamber A is then controlled so as to be reduced at a given ratio in the well known manner.

As described above, the spring seat 18 is of such a size that its outer arcuate surfaces a, b, c are substantially held against the inner peripheral surface of the open hole 8 of the inner hole 2. During assembly, the spring seat 18 may be inserted into the open hole 8 while being guided by the inner peripheral surface of the hole 8. Therefore, the spring seat 18 can be mounted, without being tilted, in the open hole 8 in a proper posture.

Because the spring seat 18 has a polygonal profile, it can be inserted into the open hole 8 with a relatively small force, and hence can easily be mounted in position.

The polygonal spring seat 18 allows gaps G to be defined between itself and the inner peripheral surface of the open hole 8. The gaps G serve as an air vent passage when the plunger 14 is moved to compress the preloading spring 19 until it is held closely against the spring seat 18.

Figure 3:
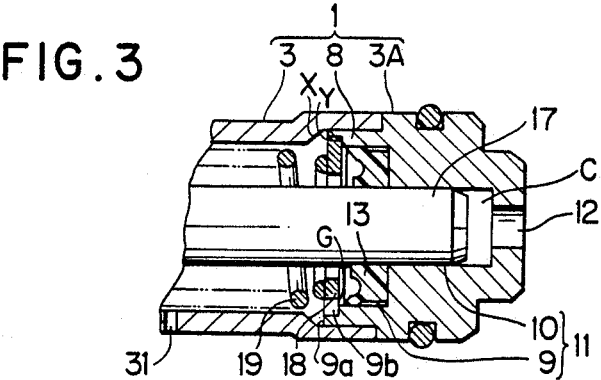
FIG. 3 is a fragmentary longitudinal cross-sectional view of a fluid pressure control valve according to another embodiment of the present invention.

FIG. 3 fragmentarily shows a fluid pressure control valve according to another embodiment of the present invention. The embodiment of FIG. 3 differs from the fluid pressure control valve shown in FIG. 1 in that a spring seat 18 is lightly forced in and held by a cover mermber 3A which is fitted in an open hole 8 of a cylindrical member 3 and closes the open hole 8. The cover member 3A has a stepped recess 11 composed of a recess 9 and a hole 10 opening in the bottom of the recess 9 and an air vent passage 12 defined through the bottom of the hole 10. The cover member 3A also has a recess 9b defined in the distal end 9a of the recess 9, the recess 9b having a diameter larger than that of the recess 9. The spring seat 18 is forced into recess 9b.

In each of the above embodiments, the recess 11 is defined in the cover member 4, 3A, respectively. However, the recess 11 may be defined in the cylindrical member.

Although certain preferred embodiments have been shown and described, it should be understood that many changes and modifications may be made therein without departing from the scope of the appended claims.

What is claimed is:

1. A fluid pressure control valve comprising:
a housing having an inner hole;
a plunger movably disposed in said inner hole;
said housing having inlet and non-pressure chambers defined therein at one end of the said plunger and an outlet chamber defined therein at the opposite end of said plunger, said housing also having a passage fluidly communicating said outlet chamber and said inlet chamber;
a valve device disposed in said passage and openable and closable in response to movement of said plunger;
a preloading spring disposed in said housing for normally urging said plunger in a direction to open said valve device, the inner diameter of said preloading spring being greater than the diameter of said plunger for defining a first spring space therebetween, and the outer diameter of said spring being smaller than the housing for defining a second spring space therebetween;
said housing comprising a cylindrical member having one open end and a cover member closing said open end;
said cover member having a recess for mounting a seal member through which said plunger slidably penetrates;
a seal member mounted in said recess of said cover member and receiving said plunger;
a spring seat disposed in said housing, said spring seat force-fitted in a fitted portion provided in said housing at said one open end of said cylindrical member adjacent to said recess and engaging said cover member, said spring seat having a hole therein for receiving said movable plunger therethrough, said plunger having a diameter smaller than the diameter of said hole in said spring seat for defining a gap therebetween, said plunger being received in said hole in said spring seat, and said preloading spring acting between said spring seat and said plunger;

at least one notched portion provided on an outer periphery of said spring seat between said outer periphery and said fitted portion of said housing, said at least one notched portion fluidly communicating said inlet chamber and said recess; and said first spring space, said second spring space, said gap between said plunger and said spring seat, and said at least one notched portion all fluidly communicating said outlet chamber and said inlet chamber even when said spring is completely compressed.

2. A fluid pressure control valve according to claim 1, wherein a plurality of notched portions are provided in said spring seat between said spring seat and said fitted portion of said housing.

3. A fluid pressure control valve according to claim 1, wherein said fitted portion of said housing is provided in said cover member, said recess and said fitted portion are each substantially circular, and the diameter of said fitted portion is greater than the diameter of said recess.

4. A fluid pressure control valve according to claim 2, wherein said inner hole comprises a first hole and a second hole, said first and second hole are each substantially circular, said second hole has a diameter larger than that of said first hole, and said second hole receives said cover member.

5. A fluid pressure control valve according to claim 1, wherein said inner hole includes a first hole and a second hole, said first and second hole are each substantially circular, said second hole has a diameter larger than said first hole, with a step defined between said first and second holes, and said spring seat is positioned between said step and said cover member.

6. A fluid pressure control valve according to claim 1, wherein said inner hole includes a first hole and a second hole, said first and second hole are each substantially circular, said second hole has a diameter larger than said first hole, and said second hole is said fitted portion.

* * * * *